United States Patent
Kusama et al.

(10) Patent No.: US 11,352,011 B2
(45) Date of Patent: Jun. 7, 2022

(54) INFORMATION PROCESSING SYSTEM, PROGRAM, AND INFORMATION PROCESSING METHOD

(71) Applicant: TOYOTA JIDOSHA KABUSHIKI KAISHA, Toyota (JP)

(72) Inventors: Eiichi Kusama, Anjo (JP); Masatoshi Hayashi, Nisshin (JP); Hisanori Mitsumoto, Hadano (JP); Kuniaki Jinnai, Nagoya (JP); Makoto Akahane, Shinjuku-ku (JP); Yuriko Yamaguchi, Shibuya-ku (JP); Daisuke Kato, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 38 days.

(21) Appl. No.: 16/701,432

(22) Filed: Dec. 3, 2019

(65) Prior Publication Data
US 2020/0198643 A1 Jun. 25, 2020

(30) Foreign Application Priority Data
Dec. 20, 2018 (JP) .............................. JP2018-238715

(51) Int. Cl.
*B60W 40/068* (2012.01)
*B60W 40/064* (2012.01)
(Continued)

(52) U.S. Cl.
CPC ........ *B60W 40/068* (2013.01); *B60W 40/064* (2013.01); *G06V 20/588* (2022.01); *G08G 1/096791* (2013.01); *B60W 2552/20* (2020.02); *B60W 2552/40* (2020.02); *B60W 2555/20* (2020.02)

(58) Field of Classification Search
CPC ............. B60W 40/068; B60W 40/064; B60W 2552/20; B60W 2552/40; B60W 2555/20; G06K 9/00798; G08G 1/096791
See application file for complete search history.

(56) References Cited

U.S. PATENT DOCUMENTS

| | | | |
|---|---|---|---|
| 6,356,839 B1 * | 3/2002 | Monde ............... | G01C 21/3492 340/995.23 |
| 10,324,463 B1 * | 6/2019 | Konrardy ............... | G01S 19/14 |

(Continued)

FOREIGN PATENT DOCUMENTS

| | | |
|---|---|---|
| CN | 104335011 A | 2/2015 |
| CN | 107844796 A | 3/2018 |

(Continued)

*Primary Examiner* — Yazan A Soofi
*Assistant Examiner* — Naeem Taslim Alam
(74) *Attorney, Agent, or Firm* — Oblon, McClelland, Maier & Neustadt, L.L.P.

(57) ABSTRACT

An information processing system includes one or more vehicles, and a server communicable with the one or more vehicles. The vehicle acquires an image obtained by imaging a road on which a host vehicle is located. The vehicle or the server determines a degree of difficulty in traveling on the road due to snow cover from the image. The server stores the degree of difficulty in traveling for each of one or more roads, and provides information to a client by using the stored degree of difficulty in traveling for each of one or more roads.

11 Claims, 6 Drawing Sheets

(51) Int. Cl.
*G06K 9/00* (2022.01)
*G08G 1/0967* (2006.01)
*G06V 20/56* (2022.01)

(56) References Cited

U.S. PATENT DOCUMENTS

| | | | | |
|---|---|---|---|---|
| 2010/0079590 | A1* | 4/2010 | Kuehnle | G06T 7/246 |
| | | | | 348/118 |
| 2014/0062725 | A1* | 3/2014 | Maston | G08G 1/0112 |
| | | | | 340/905 |
| 2015/0356867 | A1* | 12/2015 | Bogren | G08G 1/0116 |
| | | | | 340/905 |
| 2016/0055383 | A1* | 2/2016 | Akamine | G06K 9/033 |
| | | | | 382/104 |
| 2017/0161571 | A1* | 6/2017 | Zhao | B60R 1/00 |
| 2017/0241778 | A1* | 8/2017 | Hanatsuka | G08G 1/01 |
| 2018/0079424 | A1* | 3/2018 | Myers | G06N 7/005 |
| 2018/0081362 | A1* | 3/2018 | Linke | G06N 20/00 |
| 2018/0114299 | A1* | 4/2018 | Hattori | H04N 9/64 |
| 2018/0151066 | A1* | 5/2018 | Oba | G01C 21/3407 |
| 2019/0084564 | A1* | 3/2019 | Miura | B60W 30/12 |
| 2019/0092326 | A1* | 3/2019 | Honda | B60W 10/30 |
| 2019/0154451 | A1* | 5/2019 | Nystrom | G08G 1/167 |
| 2019/0251481 | A1* | 8/2019 | Rennie | G06Q 10/00 |
| 2020/0192403 | A1* | 6/2020 | Silver | B60W 10/20 |
| 2020/0198649 | A1* | 6/2020 | Emura | B60W 50/0098 |
| 2020/0278203 | A1* | 9/2020 | Montagut | G02F 1/29 |

FOREIGN PATENT DOCUMENTS

| | | |
|---|---|---|
| JP | 2013-061726 A | 4/2013 |
| JP | 2017-130871 A | 7/2017 |
| WO | 2018/051913 A1 | 3/2018 |

* cited by examiner

INFORMATION PROCESSING SYSTEM, PROGRAM, AND INFORMATION PROCESSING METHOD

INCORPORATION BY REFERENCE

The disclosure of Japanese Patent Application No. 2018-238715 filed on Dec. 20, 2018 including the specification, drawings and abstract is incorporated herein by reference in its entirety.

BACKGROUND

1. Technical Field

The disclosure relates to an information processing system, a program, and an information processing method.

2. Description of Related Art

In the related art, a technology for acquiring information on snow cover has been known. For example, Japanese Unexamined Patent Application Publication No. 2013-061726 (JP 2013-061726 A) discloses a technology in which an in-vehicle camera mounted on a vehicle images snowfall to visually observe the snowball amount and acquires snowfall amount measurement data by analyzing the imaged image data.

SUMMARY

However, the technology disclosed in JP 2013-061726 A is based on the premise that snowfall is captured in the image of the in-vehicle camera. In this way, for example, snowfall amount measurement data cannot be acquired in a place where there is no snowfall. Therefore, there is room for improvement in the related art for acquiring information on snow cover on a road.

An object of the disclosure made in consideration of the above circumstances is to improve a technology for acquiring information on snow cover on a road.

A first aspect of the disclosure relates to an information processing system including one or more vehicles and a server communicable with the one or more vehicles. The vehicle is configured to acquire an image obtained by imaging a road on which a host vehicle is located. The vehicle or the server is configured to execute determination processing for determining a degree of difficulty in traveling on the road due to snow cover from the image. The server is configured to store the degree of difficulty in traveling for each of one or more roads and provide information to a client by using the stored degree of difficulty in traveling for each of the one or more roads.

A second aspect of the disclosure relates to a program. The program causes a vehicle communicable with a server to execute steps of acquiring an image obtained by imaging a road on which a host vehicle is located and determining a degree of difficulty in traveling on the road due to snow cover from the image.

A third aspect of the disclosure relates to an information processing method executed by an information processing system including one or more vehicles and a server communicable with the one or more vehicles. The method includes acquiring, by the vehicle, an image obtained by imaging a road on which a host vehicle is located, determining, by the vehicle or the server, a degree of difficulty in traveling on the road due to snow cover from the image, storing, by the server, the degree of difficulty in traveling for each of one or more roads, and providing, by the server, information to a client by using the stored degree of difficulty in traveling for each of the one or more roads.

With the information processing system, the program, and the information processing method according to the aspects of the disclosure, the technology for acquiring information on snow cover on road is improved.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, embodiments of the present disclosure will be described.

Configuration of Information Processing System

Figure 1:
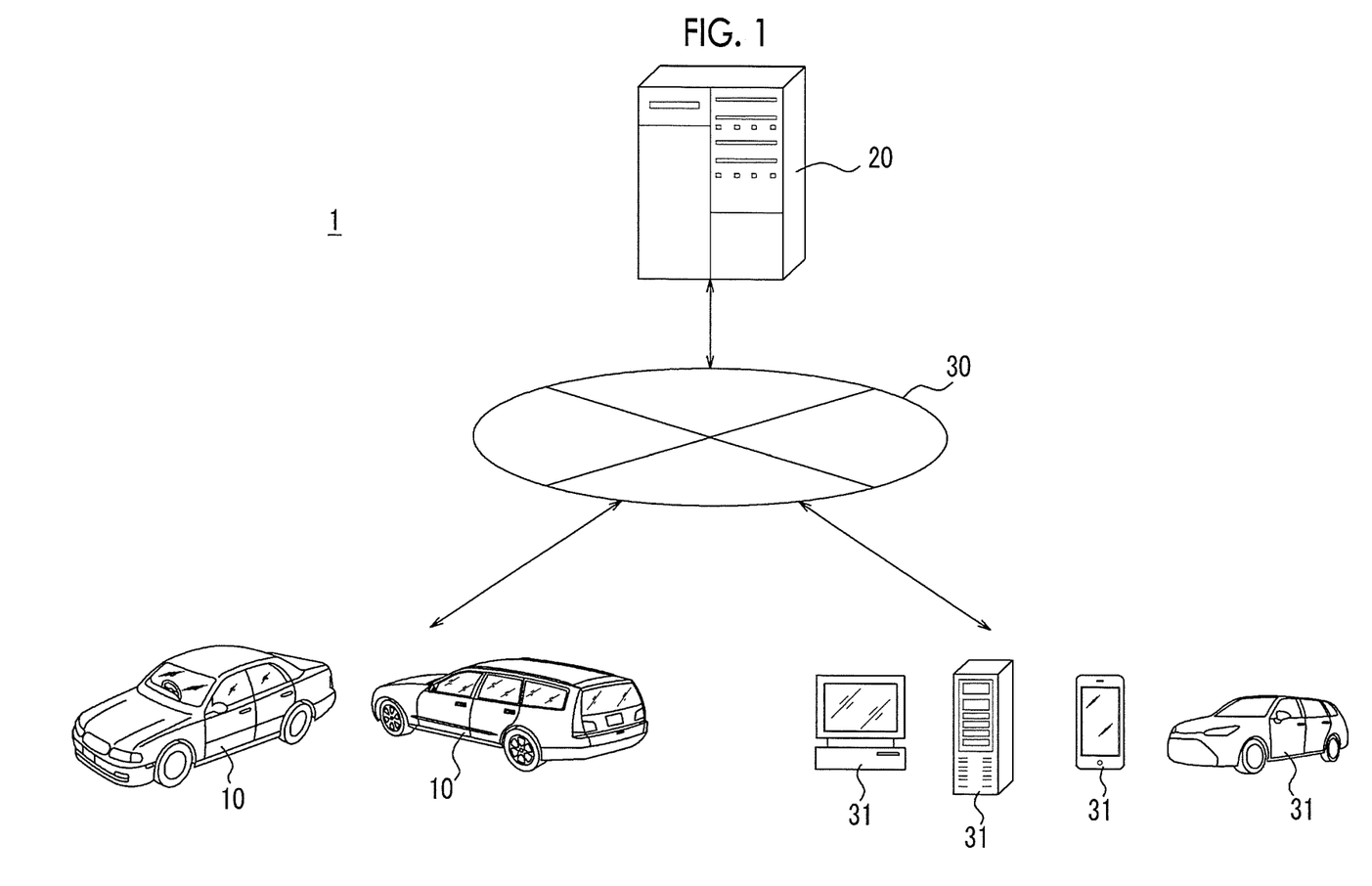
FIG. 1 is a diagram showing a schematic configuration of an information processing system according to an embodiment of the disclosure.

An overview of an information processing system 1 according to an embodiment of the present disclosure will be described with reference to FIG. 1. The information processing system 1 includes one or more vehicles 10 and a server 20. The vehicles 10 are, for example, automobiles, but they are not limited thereto and may be arbitrary vehicles. In FIG. 1, for convenience of description, only two vehicles 10 are illustrated, but the information processing system 1 may include any number of vehicles 10. The server 20 includes one or a plurality of information processing devices (for example, server devices) that can communicate with each other. The vehicle 10 and the server 20 can communicate through a network 30 including, for example, a mobile communication network and the Internet. Further, the server 20 can communicate with a client 31 through the network 30. The client 31 is, for example, a personal computer (PC), a server device, a smartphone, or a vehicle, but may be any information processing device. The vehicle 10 according to the embodiment may be the client 31.

The outline of the embodiment will be described first, and the details thereof will be described later. The vehicle 10 acquires an image obtained by imaging a road on which a host vehicle is located, for example, by using an in-vehicle camera. Here, when the vehicle 10 is located in a snow cover area or a snowfall area, snow cover may be present on the road on the image. In general, the degree of difficulty in traveling on a road varies depending on snow cover conditions. The vehicle 10 determines, from the image, the degree of difficulty in traveling on the road due to snow cover, and transmits it to the server 20. The server 20 receives the degree of difficulty in traveling for each of one or more roads from one or a plurality of vehicles 10 and stores the degree of difficulty in traveling. Then, the server 20 provides information to the client 31 by using the stored degree of difficulty in traveling for each of the one or more roads.

As described above, according to the embodiment, the degree of difficulty in traveling on the road due to snow cover is determined by using the image actually imaged by the vehicle 10. The degree of difficulty in traveling determined from the actual image is highly accurate information that is more in line with the actual situation in the field than, for example, the degree of difficulty in traveling estimated from weather information. Therefore, the technique for acquiring information on snow cover on a road is improved.

Next, each configuration of the information processing system 1 will be described in detail.

Configuration of Vehicle

Figure 2:
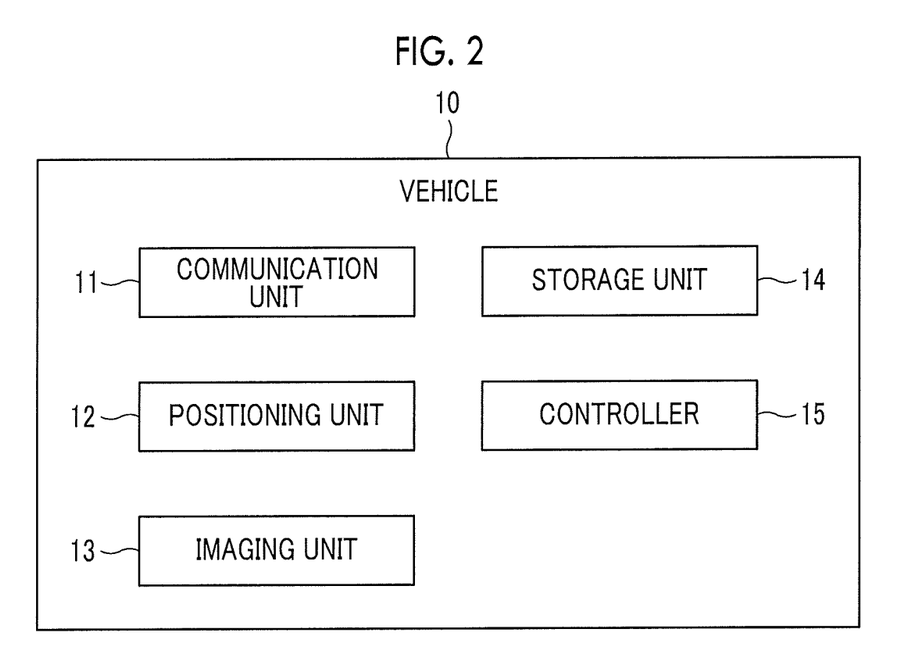
FIG. 2 is a block diagram showing a schematic configuration of a vehicle.

As shown in FIG. 2, the vehicle 10 includes a communication unit 11, a positioning unit 12, an imaging unit 13, a storage unit 14, and a controller 15. The communication unit 11, the positioning unit 12, the imaging unit 13, the storage unit 14, and the controller 15 may be respectively built in the vehicle 10 or may be respectively provided in the vehicle 10 in a detachable manner. The communication unit 11, the positioning unit 12, the imaging unit 13, the storage unit 14, and the controller 15 are connected to each other in a communicable manner through, for example, an on-vehicle network such as controller area network (CAN) or a dedicated line.

The communication unit 11 includes a communication module connected to the network 30. The communication module is compatible with mobile communication standards such as 4th Generation (4G) and 5th Generation (5G), but is not limited thereto, and may be compatible with any communication standard. For example, an on-vehicle communication apparatus such as data communication module (DCM) may function as the communication unit 11. In the embodiment, the vehicle 10 is connected to the network 30 through the communication unit 11.

The positioning unit 12 includes a receiver compatible with a satellite positioning system. The receiver is compatible with, for example, a global positioning system (GPS), but is not limited thereto, and may be compatible with any satellite positioning system. The positioning unit 12 includes, for example, a gyro sensor and a geomagnetic sensor. For example, a car navigation device may function as the positioning unit 12. In the embodiment, the vehicle 10 acquires the position of a host vehicle and a direction in which the host vehicle is facing by using the positioning unit 12.

The imaging unit 13 includes an in-vehicle camera that generates an image obtained by imaging a subject in the field of view. The image may be a still image or a moving image. The in-vehicle camera may be a monocular camera or a stereo camera. The imaging unit 13 is provided in the vehicle 10 such that the road on which the vehicle 10 is located can be imaged. More specifically, the imaging unit 13 may be provided in the vehicle 10 such that a road in front of the vehicle 10 can be imaged. For example, an electronic apparatus having a camera function such as a drive recorder or a smartphone used by an occupant may function as the imaging unit 13. In the embodiment, the vehicle 10 acquires an image obtained by imaging a road on which a host vehicle is located by using the imaging unit 13.

The storage unit 14 includes one or more memories. In the embodiment, the "memory" is, for example, a semiconductor memory, a magnetic memory, or an optical memory, but is not limited thereto. Each memory included in the storage unit 14 may function as, for example, a main storage device, an auxiliary storage device, or a cache memory. The storage unit 14 stores predetermined information used for the operation of the vehicle 10. For example, the storage unit 14 may store a system program, an application program, embedded software, road map information and the like. The road map information includes, for example, road identification (ID) and junction ID allowing roads (links) and junctions (nodes) between roads to be uniquely identified, respectively, and position information on the road and the junction. The information stored in the storage unit 14 may be updatable with, for example, information to be acquired from the network 30 through the communication unit 11.

The controller 15 includes one or more processors. In the embodiment, the "processor" is a general-purpose processor, a dedicated processor specialized for specific processing, or the like, but is not limited thereto. For example, an electronic control unit (ECU) mounted on the vehicle 10 may function as the controller 15. The controller 15 has a time measuring function for grasping the current time. The controller 15 controls the operation of the entire vehicle 10.

For example, the controller 15 acquires weather information indicating a snow cover area or a snowfall area. Specifically, the controller 15 may acquire weather information from any node on the network 30 storing the weather information, for example, an organization, such as the Meteorological Agency, or the server 20, through the communication unit 11.

Moreover, the controller 15 determines whether or not the host vehicle is located in the snow cover area or the snowfall area indicated by the acquired weather information. When determination is made that the host vehicle is located in the snow cover area or the snowfall area, the controller 15 acquires an image obtained by imaging the road on which the host vehicle is located. Here, when determination is made that the host vehicle is in the snow cover area or the snowfall area, the controller 15 may acquire the image by imaging the scenery outside the vehicle by the imaging unit 13. Alternatively, the controller 15 may cause the imaging unit 13 to image a moving image of the road on which the host vehicle is located, and acquire an image by extracting the image from the moving image when determination is made that the host vehicle is in the snow cover area or the snowfall area. The controller 15 acquires the time (imaging time) when the acquired image has been imaged and the road ID of the road on which the host vehicle is located. The road ID can be acquired, for example, based on a comparison between the location of the vehicle 10 (imaging position) at the imaging time of the image and the road map information stored in the storage unit 14.

Furthermore, the controller 15 executes determination processing for determining the degree of difficulty in traveling on the road due to snow cover. In the embodiment, the higher the degree of difficulty in traveling, the more difficult the road traveling is. The degree of difficulty in traveling may be indicated by a grade (for example, "low", "medium", and "high") or may be indicated by a numerical value (for example, 1 to 100).

In determining the degree of difficulty in traveling, any method using an image can be employed. In the embodiment, the controller 15 tries to detect a predetermined detection target from the image described above. The detection target is any target suggesting that the road is not in a traveling impossible state (for example, a state in which the road is completely covered with snow). In other words, the detection target is any target suggesting that the road is in a traveling possible state. A specific example of the detection target will be described below. The controller 15 determines that the degree of difficulty in traveling on the road is lower when at least one detection target is detected than when no detection target is detected (for example, the road is completely covered with snow). In addition, the controller 15 may determine that the degree of difficulty in traveling is the highest when no detection target is detected.

Figure 3:
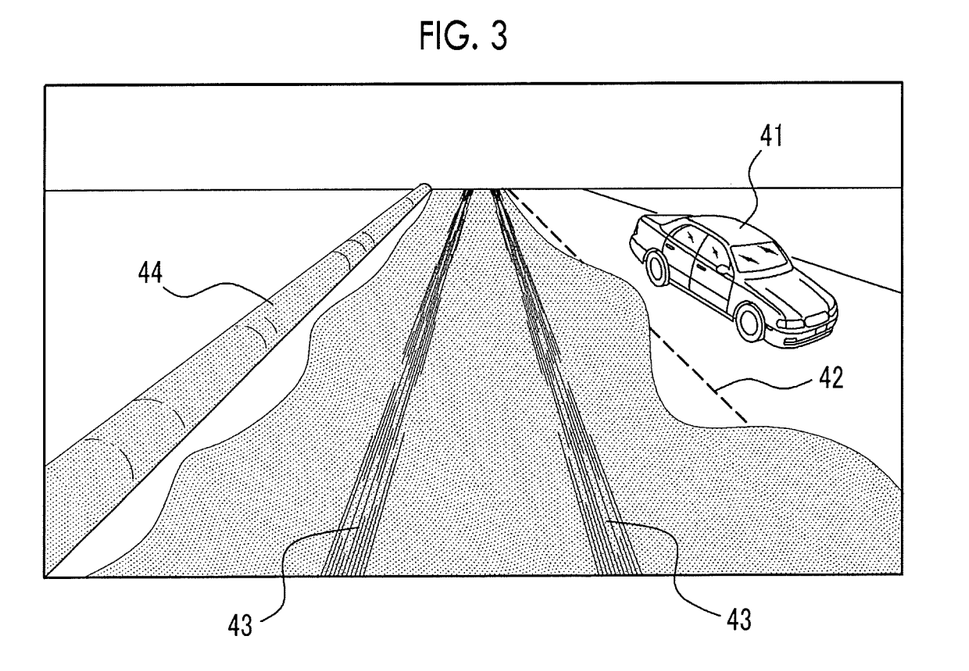
FIG. 3 is a diagram showing an image obtained by imaging a scenery outside a vehicle.

A specific example of the detection target will be described below. For example, as shown in FIG. 3, the above-mentioned image can include snow cover on the road (dots in the figure), an oncoming vehicle 41, a white line 42, tire traces 43, and snow 44 piled up beside the road. When another vehicle traveling on the road (for example, the oncoming vehicle 41 or a preceding vehicle) is shown in the image, since the other vehicle is actually traveling on the road, it can be said that the road is highly likely to be in a travelable state. In addition, when a road marking on the road (for example, the white line 42 or a crosswalk) is shown in the image, since the road is not completely covered with snow, it can be said that the road is highly likely to be in the travelable state. Furthermore, when the tire traces 43 are shown in the image, since it is considered that the preceding vehicle has traveled on the road a short time ago, it can be said that the road is highly likely to be in the travelable state. Furthermore, when snow 44 piled up beside the road is shown in the image, since it is considered that snow removal work has been carried out, it can be said that the road is highly likely to be in the travelable state. For this reason, in the embodiment, when at least one of the four detection targets, that is, another vehicle traveling on the road, the road marking on the road, tire traces on the road, and the snow piled up beside the road is detected, the controller 15 determines that the degree of difficulty in traveling is lower than when none of the detection targets is detected. Any image recognition algorithm such as pattern matching, feature extraction, or machine learning, can be employed for the detection of the detection targets. Furthermore, the detection target is not limited to the above example, and may be arbitrarily determined.

Further, the controller 15 transmits the above-described road ID, the imaging time, and the degree of difficulty in traveling to the server 20 through the communication unit 11. Here, the controller 15 may further transmit the image to the server 20, for example.

Configuration of Server

Figure 4:
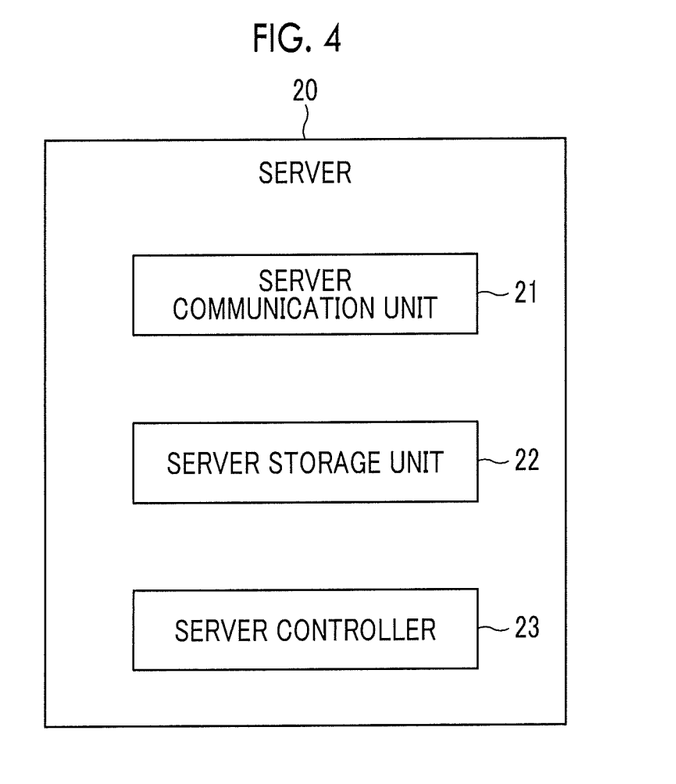
FIG. 4 is a block diagram showing a schematic configuration of a server.

As shown in FIG. 4, the server 20 includes a server communication unit 21, a server storage unit 22, and a server controller 23.

The server communication unit 21 includes a communication module connected to the network 30. The communication module is compatible with, for example, a wired local area network (LAN) standard, but is not limited thereto, and may be compatible with any communication standard. In the embodiment, the server 20 is connected to the network 30 through the server communication unit 21.

The server storage unit 22 includes one or more memories. Each memory included in the server storage unit 22 may function as, for example, a main storage device, an auxiliary storage device, or a cache memory. The server storage unit 22 stores predetermined information used for the operation of the server 20. For example, the server storage unit 22 may store a system program, an application program, a database, road map information and the like. The information stored in the server storage unit 22 may be updatable with, for example, information to be acquired from the network 30 through the server communication unit 21.

The server controller 23 includes one or more processors. The server controller 23 controls the operation of the entire server 20.

Figure 5:
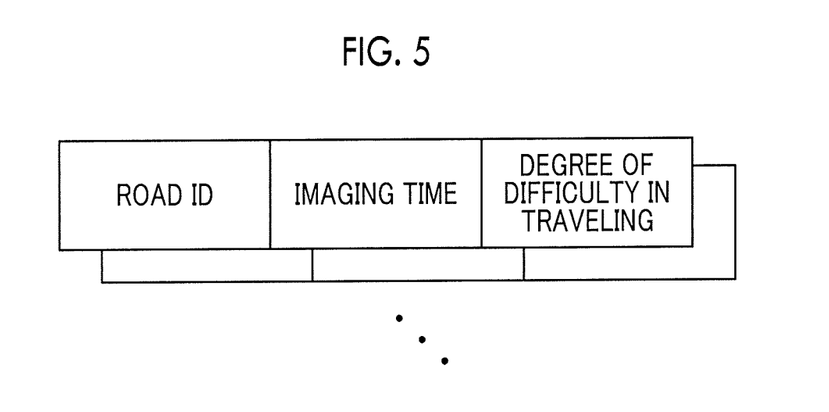
FIG. 5 is a diagram showing an example of information stored in the server.

For example, the server controller 23 collects information from one or more vehicles 10. Specifically, the server controller 23 receives the road ID, the imaging time and the degree of difficulty in traveling for each of one or more roads from one or more vehicles 10 through the server communication unit 21. The server controller 23 stores the received information in the server storage unit 22. Specifically, for example, as shown in FIG. 5, the degree of difficulty in traveling and the like for each of one or more roads are stored in the database of the server storage unit 22. As described above, when the vehicle 10 transmits the image to the server 20, the server controller 23 may also store the image in the database of the server storage unit 22.

In addition, the server controller 23 provides information to the client 31 by using the degree of difficulty in traveling and the like for each of the one or more roads, stored in the server storage unit 22. The provision of information may be performed, for example, in response to the request from the client 31 (for example, pull distribution), or may be automatically performed by the server controller 23 (for example, push distribution). The provision of information may be performed by a web application stored in the server storage unit 22. The provision of information performed by using the degree of difficulty in traveling and the like for each of the one or more roads may include providing at least part of the information such as the degree of difficulty in traveling stored in the server storage unit 22 as it is, or may include providing any information to be newly generated by using the degree of difficulty in traveling and the like.

Figure 6:
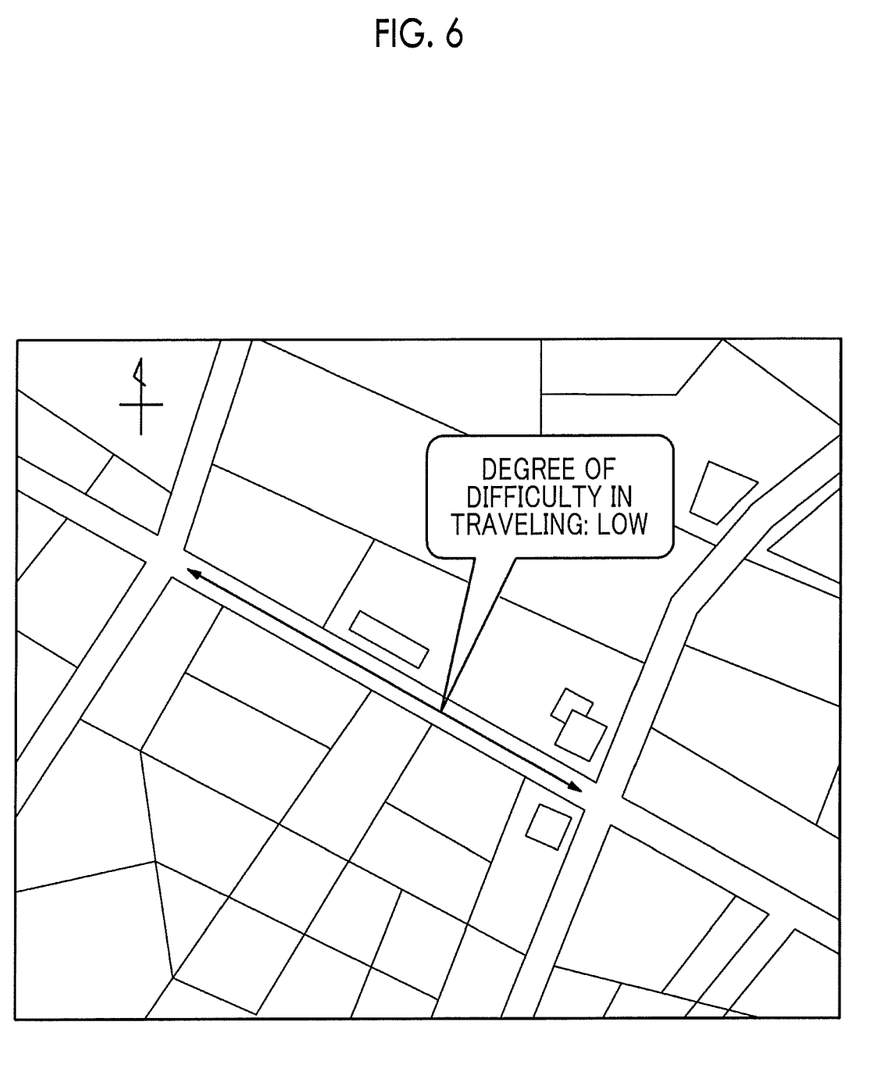
FIG. 6 is a diagram showing an example of providing information from the server to a client.

For example, FIG. 6 is a diagram showing an example of a screen displayed to the client 31 based on the information provided from the server 20. In the screen shown in FIG. 6, the degree of difficulty in traveling on the road, which is indicated by an arrow on a map, is displayed. The user of the client 31 can grasp the degree of difficulty in traveling on the road at a glance by visually recognizing the screen. As described above, when the vehicle 10 transmits the image to the server 20, the screen displayed on the client 31 may display the image and the degree of difficulty in traveling on the road indicated by the arrow on the map. In addition, for example, a configuration is also possible in which the arrow is displayed on the map and then the image and the degree of difficulty in traveling on the road indicated by the arrow are displayed according to a user operation for selecting the arrow.

Operation Flow of Vehicle

Figure 7:
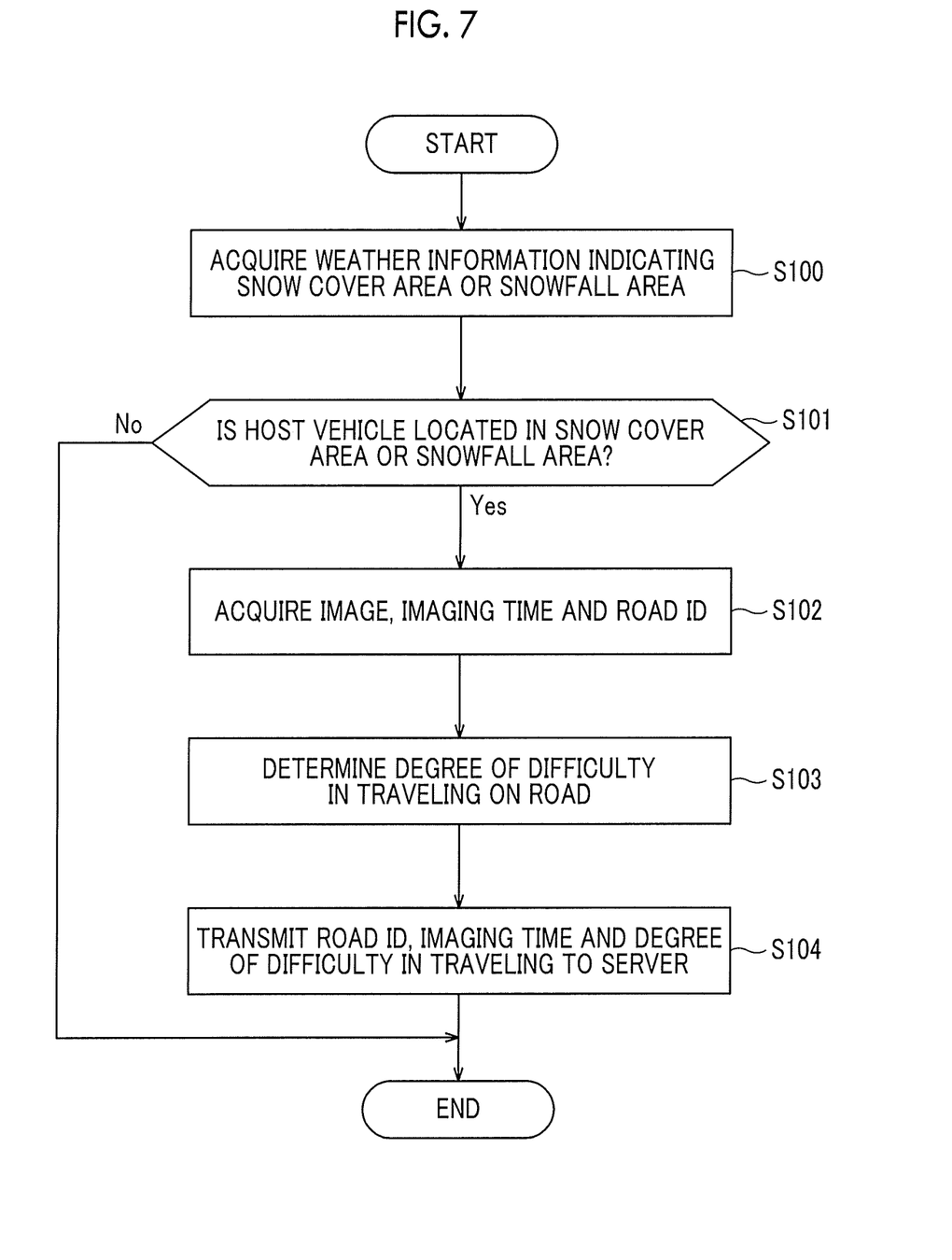
FIG. 7 is a flowchart showing an operation of the vehicle.

An operation flow of the vehicle 10 will be described with reference to FIG. 7.

Step S100: The controller 15 acquires weather information indicating a snow cover area or a snowfall area.

Step S101: The controller 15 determines whether or not the host vehicle is located in the snow cover area or the snowfall area indicated by the acquired weather information. When determination is made that the host vehicle is not located in the snow cover area or the snowfall area (step S101—No), the process ends. On the other hand, when determination is made that the host vehicle is located in the snow cover area or the snowfall area (step S101—Yes), the process proceeds to step S102.

Step S102: The controller 15 acquires an image obtained by imaging the road on which the host vehicle is located, an imaging time of the image, and a road ID of the road.

Step S103: The controller 15 determines the degree of difficulty in traveling on the road due to snow cover from the image in step S102.

Step S104: The controller 15 transmits the above-mentioned road ID, the imaging time, and the degree of difficulty in traveling to the server 20 through the communication unit 11.

Operation Flow of Server

Figure 8:
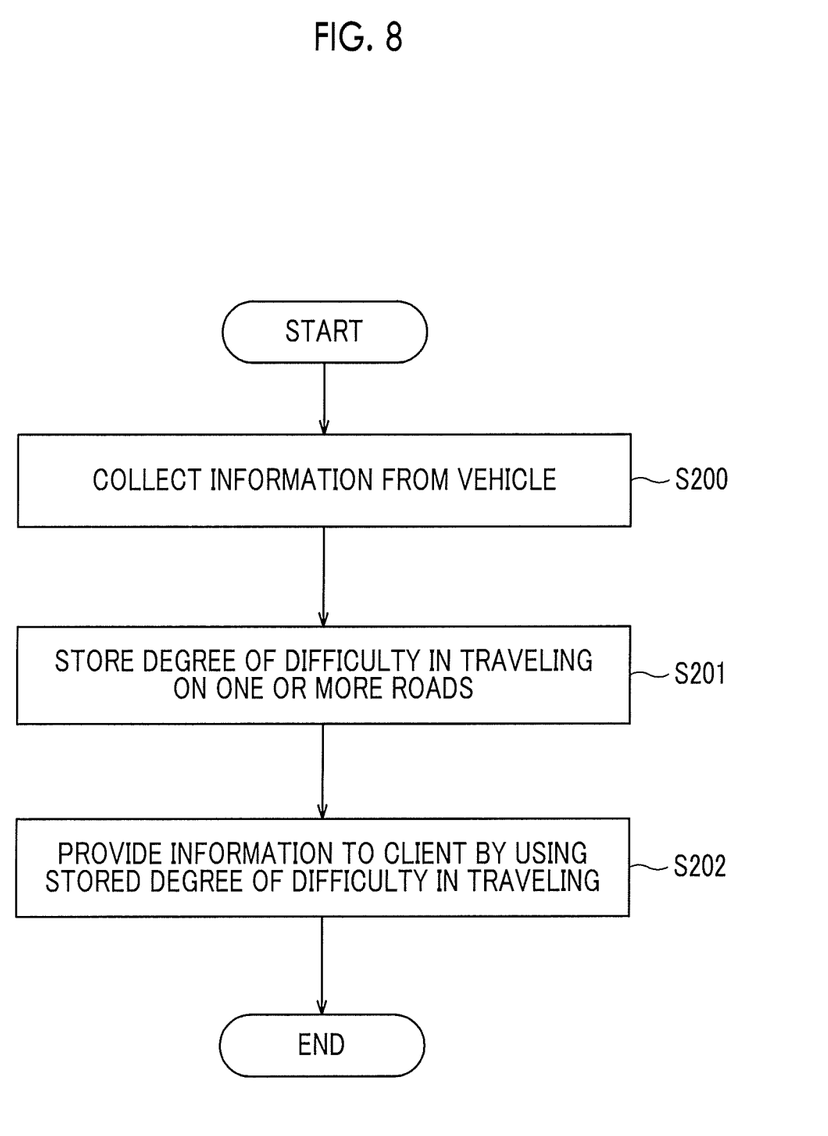
FIG. 8 is a flowchart showing an operation of the server.

An operation flow of the server 20 will be described with reference to FIG. 8.

Step S200: The server controller 23 collects information from one or more vehicles. Specifically, the server controller 23 receives the road ID, the imaging time and the degree of difficulty in traveling for each of one or more roads from one or more vehicles 10 through the server communication unit 21.

Step S201: The server controller 23 stores information received in Step S200 (the road ID, the imaging time, and the degree of difficulty in traveling for each of the one or more roads) in the server storage unit 22.

Step S202: The server controller 23 provides information to the client 31 by using the degree of difficulty in traveling and the like for each of the one or more roads, stored in the server storage unit 22.

As described above, in the information processing system 1 according to the embodiment, the vehicle 10 acquires the image obtained by imaging the road on which the host vehicle is located, and determines the degree of difficulty in traveling on the road due to snow cover from the image. The server 20 stores the degree of difficulty in traveling for each of one or more roads, and provides information to the client 31 by using the degree of difficulty in traveling for each of one or more roads. With such a configuration, the degree of difficulty in traveling due to snow cover is determined by using the image that has been actually imaged by the vehicle 10. Therefore, it is possible to obtain a more accurate degree of difficulty in traveling that is in line with the actual situation in the field than the degree of difficulty in traveling estimated from weather information, for example. Therefore, the technique for acquiring information on snow cover on a road is improved.

The disclosure has been described based on the drawings and the examples, but it is to be noted that those skilled in the art easily perform various modifications and changes based on the disclosure. Therefore, it is to be noted that the modifications and changes are included in the scope of the disclosure. For example, the functions and the like included in each unit, each step, or the like can be disposed again so as not to be logically contradictory, and a plurality of means, steps, or the like can be combined into one, or divided.

For example, in the embodiment described above, some processing operations executed in the vehicle 10 may be executed in the server 20, and some processing operations executed in the server 20 may be executed in the vehicle 10. For example, it is possible to adopt a configuration in which the determination processing for determining, from the image obtained by imaging the road, the degree of difficulty in traveling due to snow cover is made by the server 20, instead of the vehicle 10. In this case, the vehicle 10 transmits the road ID of the road, the imaging time, and the image to the server 20. The server 20 performs the above-mentioned determination by using the image received from the vehicle 10.

In addition, in the embodiment described above, the server 20 has been described to have a configuration of providing information to the client 31 by using the degree of difficulty in traveling for each of the one or more roads. However, information on the degree of difficulty in traveling is not limited to being used for providing information to the client 31, and may be used for any other purposes. For example, when the vehicle 10 can perform the autonomous driving, the controller 15 of the vehicle 10 may perform the autonomous driving by using the degree of difficulty in traveling determined by the host vehicle or received from the server 20. Specifically, when the degree of difficulty in traveling is equal to or greater than a predetermined reference value, a configuration is conceivable in which the detour of road is performed, a traveling route to a destination is determined by preferentially using a road with a low degree of difficulty in traveling, or the upper limit vehicle speed is made slower as the degree of difficulty in traveling increases.

A general-purpose information processing devices such as a smartphone, a computer, or the like can be configured to function as a configuration unit provided in the vehicle 10 according to the embodiment described above or the server 20. Specifically, a program, in which processing contents for realizing each function of the vehicle 10, the server 20 or the like according to the embodiment are described, is stored in a memory of the information processing device such that a processor of the information processing device reads and executes the program. Therefore, the disclosure according to the embodiment can also be realized as the program that can be executed by the processor.

What is claimed is:

1. An information processing system comprising:
one or more vehicles; and
a server communicable with the one or more vehicles, wherein:
a vehicle of the one or more vehicles is configured to:
acquire an image obtained by imaging a road on which the vehicle is located;
receive positioning signals from a satellite positioning system;
determine a position of the vehicle when the image was obtained based upon the positioning signals;
the vehicle or the server is configured to execute determination processing for determining a degree of difficulty in traveling on the road due to snow cover from the image including determining that the degree of difficulty in traveling on the road is lower when at least one of four detection targets is detected from the image than when no detection target is detected, the four detection targets including another vehicle traveling on the road, a road marking on the road, a tire trace on the road, and snow piled up beside the road;
the at least one of the four detection targets that is detected from the image includes the other vehicle traveling on the road;
the vehicle is configured to control driving of the vehicle based upon the degree of difficulty in traveling; and
the server is configured to:
store the degree of difficulty in traveling for each of one or more roads, and
provide information to a client by using the stored degree of difficulty in traveling for each of the one or more roads.

2. The information processing system according to claim 1, wherein the vehicle is configured to:

acquire weather information indicating a snow cover area or a snowfall area; and acquire the image when the vehicle is located in the snow cover area or the snowfall area indicated by the weather information.

3. The information processing system according to claim 1, wherein the server provides road map information including degrees of difficulty in traveling on the one or more roads to the client in the providing of information.

4. A non-transitory computer-readable medium storing a program causing a vehicle communicable with a server to execute steps of:

acquiring an image obtained by imaging a road on which the vehicle is located;

receiving positioning signals from a satellite positioning system;

determining a position of the vehicle when the image was obtained based upon the positioning signals, determining a degree of difficulty in traveling on the road due to snow cover from the image including determining that the degree of difficulty in traveling on the road is lower when at least one of four detection targets is detected from the image than when no detection target is detected, the four detection targets including another vehicle traveling on the road, a road marking on the road, a tire trace on the road, and snow piled up beside the road; and controlling driving of the vehicle based upon the degree of difficulty in traveling, wherein the at least one of the four detection targets that is detected from the image includes the other vehicle traveling on the road.

5. An information processing method executed by an information processing system including one or more vehicles and a server communicable with the one or more vehicles, the method comprising:

acquiring, by a vehicle of the one or more vehicles, an image obtained by imaging a road on which the vehicle is located;

receiving, by the vehicle, positioning signals from a satellite positioning system;

determining, by the vehicle, a position of the vehicle when the image was obtained based upon the positioning signals;

determining, by the vehicle or the server, a degree of difficulty in traveling on the road due to snow cover from the image including determining that the degree of difficulty in traveling on the road is lower when at least one of four detection targets is detected from the image than when no detection target is detected, the four detection targets including another vehicle traveling on the road, a road marking on the road, a tire trace on the road, and snow piled up beside the road;

controlling, by the vehicle, driving of the vehicle based upon the degree of difficulty in traveling;

storing, by the server, the degree of difficulty in traveling for each of one or more roads; and providing, by the server, information to a client by using the stored degree of difficulty in traveling for each of the one or more roads, wherein the at least one of the four detection targets that is detected from the image includes the other vehicle traveling on the road.

6. The information processing system according to claim 1, wherein the vehicle or the server is configured to execute the determination processing for determining the degree of difficulty in traveling on the road due to snow cover from the image including determining that the degree of difficulty in traveling on the road is lower when at least two of the four detection targets is detected from the image than when no detection target is detected.

7. The information processing system according to claim 1, wherein the vehicle or the server is configured to execute the determination processing for determining the degree of difficulty in traveling on the road due to snow cover from the image including determining that the degree of difficulty in traveling on the road is lower when at least three of the four detection targets is detected from the image than when no detection target is detected.

8. The information processing system according to claim 1, wherein the vehicle or the server is configured to execute the determination processing for determining the degree of difficulty in traveling on the road due to snow cover from the image including determining that the degree of difficulty in traveling on the road is lower when all of the four detection targets is detected from the image than when no detection target is detected.

9. The information processing system according to claim 1, wherein the vehicle or the server is configured to execute the determination processing for determining the degree of difficulty in traveling on the road due to snow cover from the image including determining that the degree of difficulty in traveling on the road is lower when the other vehicle traveling on the road and the road marking on the road are detected from the image than when no detection target is detected.

10. The information processing system according to claim 1, wherein the vehicle or the server is configured to execute the determination processing for determining the degree of difficulty in traveling on the road due to snow cover from the image including determining that the degree of difficulty in traveling on the road is lower when the other vehicle traveling on the road and the tire trace on the road are detected from the image than when no detection target is detected.

11. The information processing system according to claim 1, wherein the vehicle or the server is configured to execute the determination processing for determining the degree of difficulty in traveling on the road due to snow cover from the image including determining that the degree of difficulty in traveling on the road is lower when the other vehicle traveling on the road and the snow piled up beside the road are detected from the image than when no detection target is detected.

* * * * *